Oct. 11, 1960 S. S. LANIER, JR 2,955,699
CONVEYING APPARATUS
Filed May 9, 1957 7 Sheets-Sheet 5

INVENTOR.
Sterling S. Lanier Jr.
BY
Jennings, Carter & Thompson
Attorneys

United States Patent Office 2,955,699
Patented Oct. 11, 1960

2,955,699

CONVEYING APPARATUS

Sterling S. Lanier, Jr., P.O. Box 87, Nortonville, Ky.

Filed May 9, 1957, Ser. No. 658,035

3 Claims. (Cl. 198—109)

This invention relates to conveying apparatus and is an improvement over that described and claimed in my copending application, Serial No. 618,564, filed October 26, 1956, and entitled Conveying Apparatus, and which has issued as Patent No. 2,886,167.

An object of my invention is to provide conveying apparatus which shall be particularly adapted for conveying materials around curves and over supporting surfaces which have dips and rises therein.

Another object of my invention is to provide a conveyor which shall include improved means for propelling the same.

Another object of my invention is to provide an endless belt conveyor having a plurality of support units which are connected to each other by linked segments resembling vertebrae whereby the belt will follow any curvature or change in alignment of its supporting means.

A further object of my invention is to provide conveying apparatus of the character designated which may be mobile or stationary and which shall include improved means retaining the materials being conveyed within the confines of the conveying flight of a belt conveyor.

A further object of my invention is to provide conveying apparatus of the character designated which shall be simple of construction, economical of manufacture and one which is particularly adapted for use in coal mines and the like.

A further object of my invention is to provide conveying apparatus of the character designated which shall be particularly adapted for use with continuous loading machines in coal mines and the like whereby continuous service is provided for such loading machines, thus eliminating the necessity of intermittent, time consuming service by trucks, shuttle cars and the like.

A further object of my invention is to provide a prefabricated conveyor which shall be readily adaptable to almost any conveying need, whether for level, steeply inclined, straight line or irregularly curving conveyance without change in design.

Heretofore in the art to which my invention relates it has been necessary to limit the degree of inclination of slopes to approximately 18° in order to employ a belt conveyor to transport coal or other material up an inclined mine slope due to the fact that the coal or other material tends to roll backward down the belt. This necessitates long and highly expensive slope tunneling and correspondingly long and expensive belt conveyors. In accordance with my invention the coal or other material may be conveyed up any degree of inclination without spillage, thus permitting the use of a steeply inclined slope and greatly reducing the cost of opening a new mine. Also, my improved conveying apparatus permits economical opening of new outlets to old mines through twin drill holes of sufficient diameter to pass a tubular belt having a substantially circular cross section. Also, heretofore in the art, where means for guiding the belt have been attached to the belt, effective means have not been provided that would prevent the belt from climbing or rolling over so that the guiding means becomes ineffective, if the belt is turning a curve in the horizontal plane. In accordance with my invention the travel of the belt is controlled at all times by inescapable means of guidance.

Briefly, my improved conveying apparatus comprises an endless conveyor belt having a head terminal at one end and a tail terminal at the other end thereof around which the belt passes. The belt is preferably driven by a drive chain with take up provision for maintaining tension and which is connected to the belt at suitable points, such as along the edges thereof or along the longitudinal center thereof. However, the belt may be driven by a conventional type friction terminal pulley with conventional means of maintaining tension. The chain and belt are supported at intervals by a plurality of mobile support units which are connected to each other by a flexible controllable draw bar in the form of linked segments resembling vertebrae thereby constituting one continuous vertebrated draw bar. The draw bar is adapted to bend laterally in a horizontal arc in a controlled manner and to pivot vertically at intervals to accommodate itself to dips and rises in the supporting surface for the conveyor. Also, the linked segments of the draw bar extend along the longitudinal center line of the conveyor between the terminals and are attached to the mobile support units whereby the support units follow in tandem.

Apparatus embodying features of my invention is illustrated in the accompanying drawings forming a part of this application, in which.

Referring now to the drawings for a better understanding of my invention, I show, in Figs. 1 through 5, an endless conveyor belt 10 which passes around head and tail sections 11 and 12, respectively. Secured to the conveyor belt 10 along the longitudinal center thereof by suitable link members 13 is an endless flexible member which may be in the form of a guide chain 14. While I show the flexible member 14 as being in the form of a chain, I also contemplate employing cables and the like. The conveyor belt 10 passes over pulleys 15a which are mounted on transverse shafts 16. The shafts 16 are propelled by any suitable means, not shown. Annular recesses 15b are provided in the pulleys 15a for receiving the guide chain 14.

Figures 1, 4:
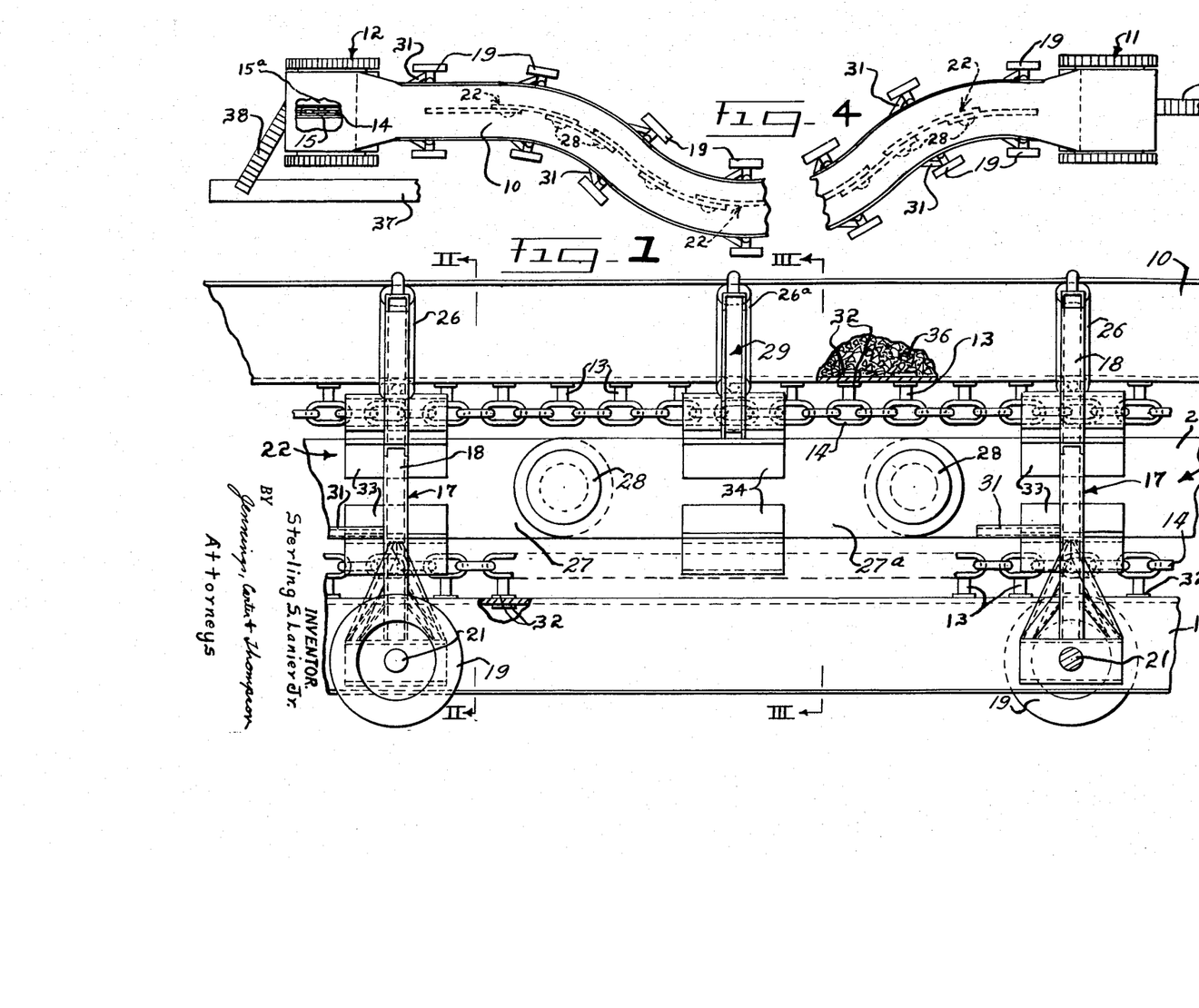
Fig. 1 is a side elevational view, partly broken away and in section showing one form of conveyor.
Fig. 4 is a plan view, drawn to a smaller scale and partly broken away and in section, showing the head and tail terminals for the conveying apparatus.
Figure 2:
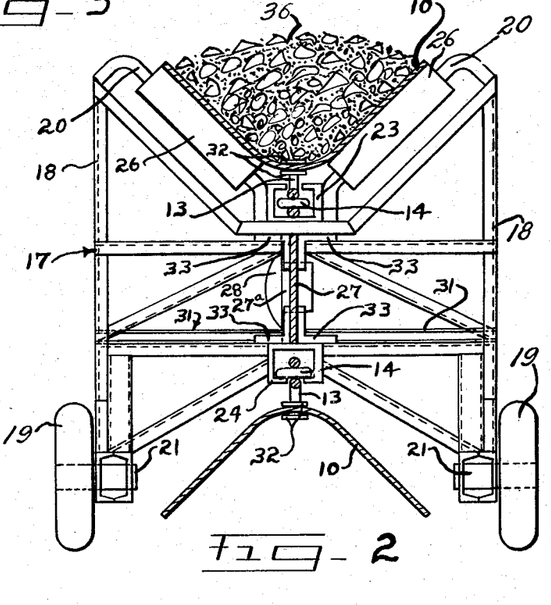
Fig. 2 is a sectional view taken generally along the line II—II of Fig. 1.

Mounted at intervals along the belt 10 are mobile support units 17 which comprise vertical frame members 18 which are supported by wheels 19. Preferably, the wheels 19 are of the pneumatic type and are supported on short stub axles 21, as shown in Fig. 2. Secured to each of the vertical frames 18 is a continuous controllably flexible draw bar 22 which is in the form of linked segments resembling vertebrae. The draw bar 22 is of a rigidity to permit it to bend in a generally horizontal arcuate path when connected between adjacent support units as shown in Fig. 4. Mounted on the frame 18 are upper and lower chain guide members 23 and 24, respectively. Each chain guide member 23 and 24 may be of channel-shape, as viewed in cross section, with the free ends of the channel legs turned inwardly to limit outward movement of the chain 14 relative to the guide members. However, I also contemplate employing flanged sheaves or rollers. The chains 14 are thus slidably supported within the confines of the guide members, as shown.

Mounted at each side of the upper guide member 23 are upwardly and outwardly extending shafts 20 for supporting idler rollers 26 which support the sides of the belt 10 in a trough-like manner, as shown. As shown in Fig. 2, the legs of the uppermost channel-like guide members 23 extend upwardly while the legs of the lowermost channel-like guide members 24 extend downwardly whereby the links 13 are adapted for free sliding movement between the inwardly turned free ends of the channel legs. The lower or return flight of the belt 10 may hang freely from the lower channel guide member 24, as shown, or if desired, suitable idlers may be provided for supporting the same.

Figure 3:
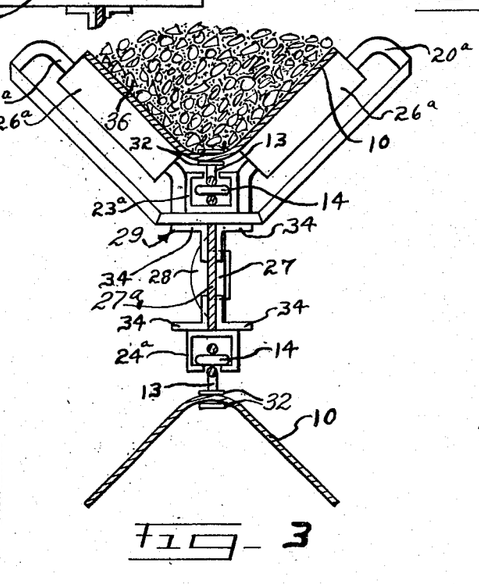
Fig. 3 is a sectional view taken generally along the line III—III of Fig. 1.
Figure 5:
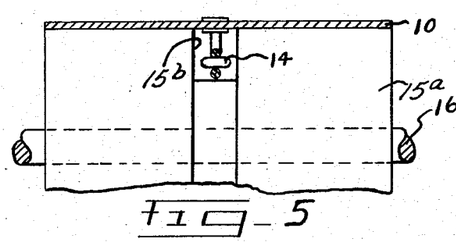
Fig. 5 is a vertical sectional view showing the pulley for the head or tail section.

The linked segments of the flexible draw bar 22 which are secured to the vertical frames 17 are indicated at 27 and are of a rectangular cross sectional area with the greater dimension extending in a vertical plane. The segments 27 are of a relatively small thickness and they may bend easily in a horizontal plane but remain rigid in a vertical plane. The ends of the linked segments 27 are connected to other segments 27a by means of pivot pins 28. The upper ends of the segments 27a are connected to intermediate support members 29 which carry channel-like guide members 23a and 24a which are similar in all respects to the channel-like guide members 23 and 24. That is, the guide members 23a and 24a receive the upper and lower flights of the chain 14 whereby the chain is supported and guided as it passes intermediate the support units 17. Mounted on the intermediate support members 29 at opposite sides of the uppermost guide members 23a are outwardly and upwardly extending shaft members 20a which rotatably support idler rolls 26a. The idler rolls 26a support the sides of the belt 10 in a trough-like manner, as shown in Fig. 3.

The vertical frames 18 are connected to the linked segments 27 of the flexible draw bar 22 by suitable angle brackets 33 and the segments 27a are connected to the intermediate support members 29 by suitable angle members 34. The vertical frames 18 may also be connected to the segments 27 by suitable diagonal brace members 31 or the like whereby the draw bar segments are not bent sharply at the point they are connected to the vertical frames 18, thus adding strength to the apparatus and assuring that the mobile support units 17 follow in tandem. The links 13 may be attached to the belt 10 by any suitable means, such as by providing disc like collars 32 on the links 13 at opposite sides of the belt 10, as shown in Figs. 2 and 3.

The material being conveyed by the belt 10, such as coal 36 or the like, may be transferred from the delivery end of the belt 10 to a second conveyor 37 by means of a relatively short transfer conveyor 38. The material is loaded onto the belt 10 at the head section 11 by a suitable loader indicated generally at 39.

Figure 6:
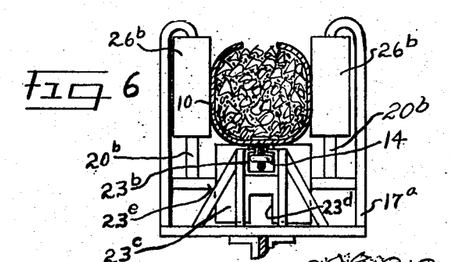
Fig. 6 is a vertical sectional view showing a modified form of conveyor.

In Fig. 6 I show a modified form of mobile support unit 17a which is supported on wheels in the same manner as the support units 17. Together with the chain guide members formed of channel shaped members 23b which are attached to the draw bar segments in advance or between adjacent rollers, I provide a lower horizontal roller 23c having an annular groove 23d therein for receiving the chain 14. If desired, twin sheaves may be substituted for the channel shaped members. The roller 23c is mounted for rotation on a shaft member 23e. Mounted at opposite sides of the roller 23c are vertical shaft members 20b for rotatably supporting idler rollers 26b which support the belt 10, as shown. By supporting the belt 10 between the vertical rollers 26b the outer edges of the belt are nearer a vertical plane passing through the longitudinal center line of the belt, thus permitting easy bending of the belt as it passes around curves.

Figure 7:
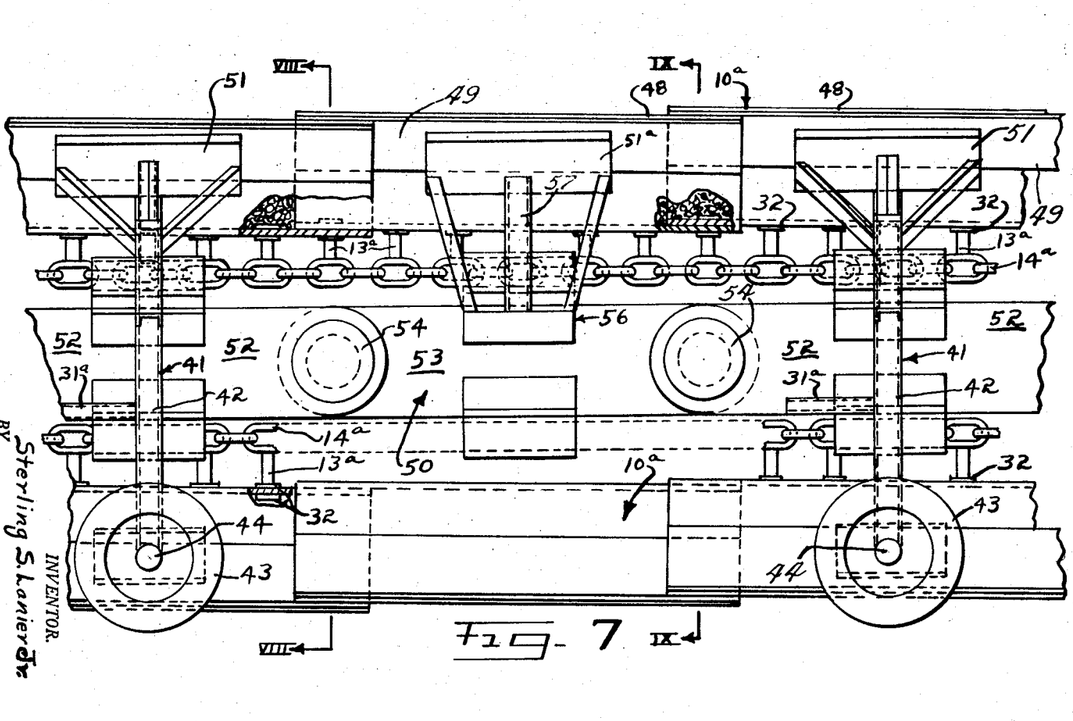
Fig. 7 is a fragmental side elevational view, partly broken away and in section showing another form of conveyor.
Figure 8:
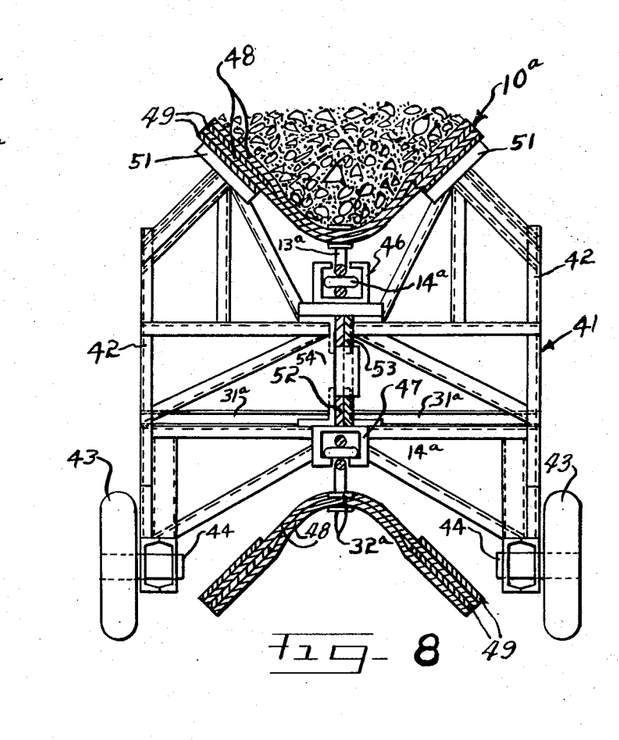
Fig. 8 is a sectional view taken generally along the line VIII—VIII of Fig. 7.
Figure 9:
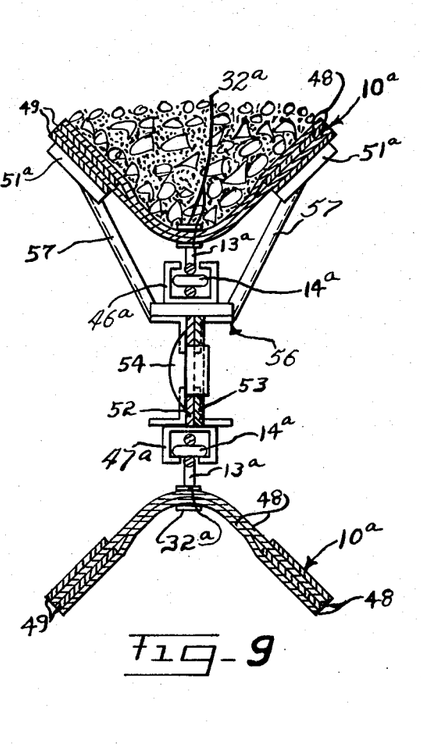
Fig. 9 is a sectional view taken generally along the line IX—IX of Fig. 7.

Referring now to Figs. 7, 8 and 9 of the drawings, I show a slightly modified form of conveyor in which the belt 10a is supported by mobile support units 41 which comprise vertical frame members 42 which are supported by wheels 43. The wheels 43 may be of the pneumatic type and are mounted on suitable short stub axles 44. Mounted on the vertical frame 42 are upper and lower chain guide members 46 and 47, respectively which are similar in all respects to the guide members 23 and 24 shown in Fig. 2.

The belt 10a is divided into a plurality of sections 48 which overlap each other, as shown in Figs. 7, 8 and 9. Secured to the under surface of the belt sections 48 adjacent the edges thereof are longitudinally extending strips of material 49 which are formed of a suitable material, such as rubber belting, metal or the like which serve as replaceable means to prevent excessive wear of the belt itself. If desired, the strips of material 49 may be eliminated. Mounted on the vertical frame 42 at opposite sides of the belt 10a are upwardly and outwardly extending slide-type support members 51 which are adapted to engage the lowermost strips of material 49 whereby the belt 10a is slidably supported by the members 51. The belt 10a is connected to a drive chain 14a by means of suitable links 13a by providing disc-like collars 32a at opposite sides of the overlapped ends of the belt section 48, as shown.

Secured to the vertical frames 42 are segments 52 of a flexible draw bar 50 which in turn are pivotally connected to flexible segments 53 by means of pivot pins 54. The flexible segments 53 are connected to intermediate support members 56, as shown in Figs. 7 and 9. Mounted on the intermediate support members 56 are channel-like guide members 46a and 47a which are similar in every respect to the channel-like guide members 46 and 47. Mounted on the intermediate support members 56 at each side of the uppermost guide member 46a are upwardly and outwardly extending support brackets 57 which support outwardly and upwardly extending guide members 51a which in turn slidably support the sides of the belt 10a adjacent the outer edges thereof, as shown in Fig. 9. The lower flight of the belt 10a hangs free, as shown in Figs. 8 and 9 or, if desired, suitable idler support rollers may be provided to support the lower flight of the conveyor belt.

The segments 52 of the draw bar 50 are connected to the vertical frame 42 by suitable angle brackets 31a or otherwise whereby strength is added to the connection between the mobile support units and the draw bar segments and the draw bar segments are maintained at substantially right angles to the mobile support units, thus assuring that the wheels of the support units follow in tandem.

Figures 10, 11, 12, 13, 14:
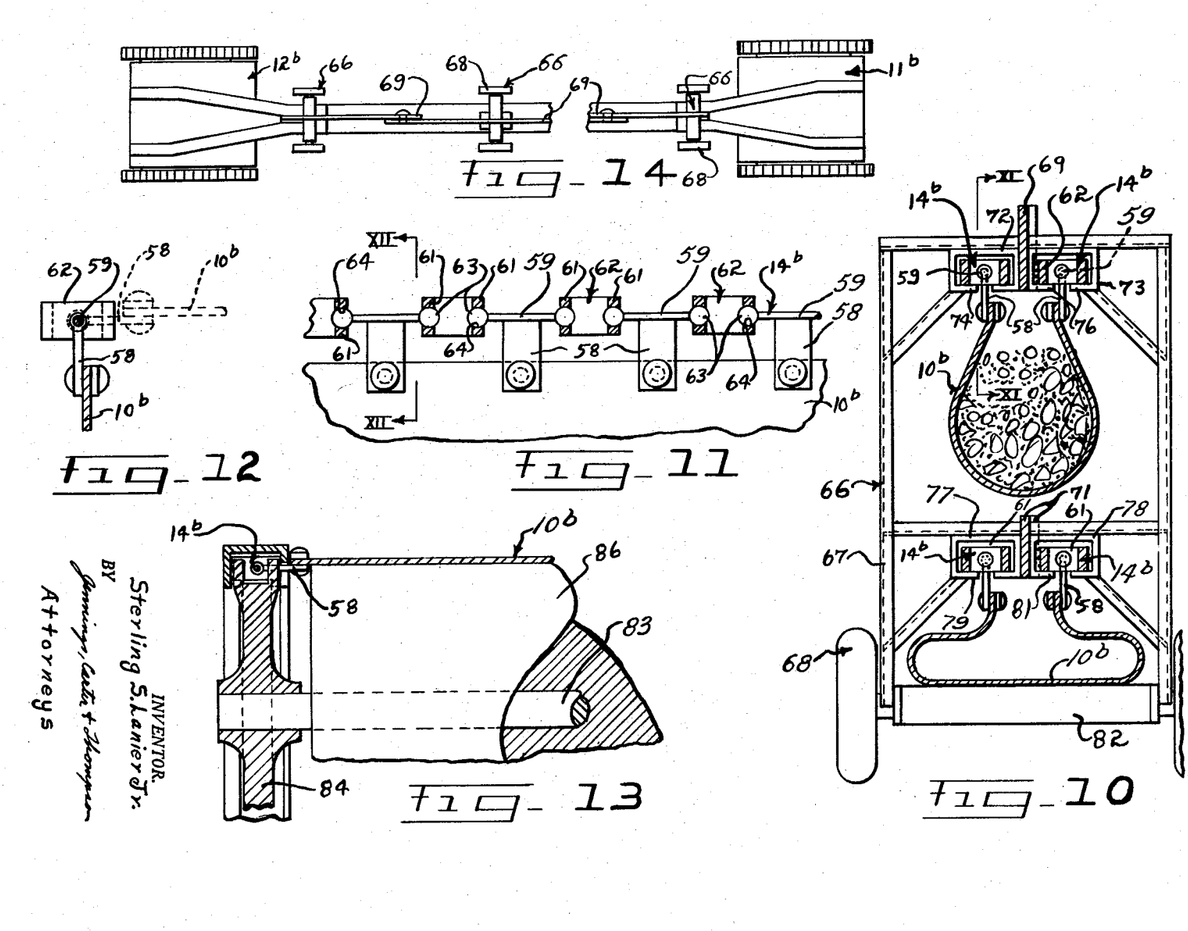
Fig. 10 is a transverse sectional view showing another modified form of conveyor.
Fig. 11 is a fragmental sectional view taken generally along the line XI—XI of Fig. 10.
Fig. 12 is a fragmental sectional view taken along the line XII–XII of Fig. 11 and showing in dotted lines the position the belt assumes as it passes around the head and tail pulleys.
Fig. 13 is a fragmental sectional view showing the sprocket drive for the conveyor shown in Figs. 10–12.
Fig. 14 is a plan view, drawn to a smaller scale and broken away, showing the head and tail sections for the apparatus shown in Figs. 10 through 13.

Referring now to Figs. 10 through 14, I show another embodiment of my invention which comprises an endless conveyor belt 10b. Secured to the edges of the belt 10b are link members 58 which in turn are secured to rod-like link members 59 which form alternate links for a swivel-type chain indicated at 14b. The rod-like members 59 extend through suitable openings provided in the opposite end plates 61 of link members 62. Axial movement of the rod-like members 59 relative to the link members 62 is limited by substantially spherical stop members 63 which are provided at the ends of the rod-like link members 59. The inner surface of each end plate 61 is provided with a partially spherical seat 64 which is adapted to receive the adjacent surface of the stop member 63, as shown in Fig. 11, thus permitting the member 59 to swivel in any direction.

The swivel chain 14b and the belt 10b are supported by mobile support units 66 which are positioned at intervals between head and tail sections 11b and 12b, as shown in Fig. 14. The mobile support units 66 comprise vertical frames 67 which are supported by wheels 68. Adjacent mobile support units 66 are connected to each other for vertical pivotal movement relative to each other by upper and lower segmental, flexible draw bars 69 and 71, respectively.

Mounted adjacent the upper ends of the vertical frame 67 are parallel guide members 72 and 73 which are substantially channel-shaped, as viewed in cross section, and have inturned flanges 74 and 76 at the free end of the legs thereof for slidably receiving the links 58, as shown in Fig. 10, with the chains 14b lying within the confines of the guide members 72 and 73. Mounted on the vertical frame 67 adjacent the lower draw bar 71 are parallel guide members 77 and 78 which are substantially channel-shaped, as viewed in transverse section and have inturned flanges 79 and 81 at the free ends of the legs thereof for receiving the link members 58. The lower or return flight of the conveyor chains 14b inescapably pass through and are supported by the channel-like guide members 77 and 78, as shown in Fig. 10. By varying the position of the guide members 72—73 and 77—78 the edges of the belt are guided together after receiving the material, and then guided apart at the discharge terminal. The lower flight of the conveyor belt 10b is supported by a transverse idler roller 82 whereby the overall height of the mobile support units 66 may be reduced. As belt 10b passes over the pulley of section 11b it is fully spread out, each chain 14b engaged by a sprocket, but after traveling a sufficient distance to receive its load, the chains are guided toward the center line, in the position shown in Fig. 10. Similarly the chain and belt edges are guided apart at the discharge terminal.

As shown in Fig. 13, the head and tail section 11b and 12b are provided with transverse drive shaft 83 having sprocket wheels 84 mounted at each end thereof. The teeth of the sprocket wheels 84 engage the links 62 intermediate the stop members 63. Mounted on the transverse shafts 83 are suitable pulleys 86 over which the conveyor belt 10b passes at the head and tail sections of the conveying apparatus. As the conveyor belt 10b passes over a pulley 86 it moves from the solid line position shown in Fig. 12 to the dotted line position. Due to the fact that the rod-like members 59 form a swivel joint with the links 62, the links 62 remain in alignment with the sprocket wheel 84 as the links 58 move outwardly to the dotted line position shown in Fig. 12.

Figure 17:
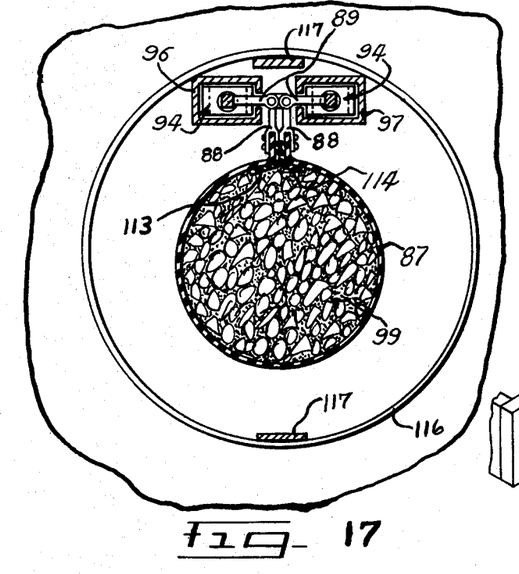
Fig. 17 is a transverse sectional view showing the conveying flight of the apparatus shown in Figs. 15 and 16.
Figure 18:
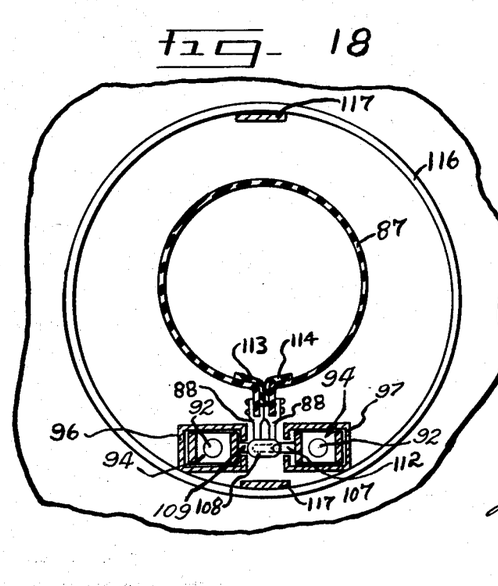
Fig. 18 is a transverse sectional view showing the return flight of the apparatus shown in Figs. 15–17.

Referring now to Figs. 15 through 20, I show a still further modified form of my invention which is adapted to convey materials, such as coal and the like, upwardly through substantially vertical mine shafts. The conveyor comprises an endless conveyor belt 87 having link members 88 attached thereto along the longitudinal edges thereof. The link members 88 are pivotally connected to transverse links 89 which in turn are secured rigidly to rod-like link members 91. The rod-like link members 91 are similar in every respect to the rod-like link members 59 and have spherical ends 92 which engage partially spherical recesses provided in the ends of link members 93 which are similar in every respect to the link members 62, shown in Fig. 11. The link members 93 and the rod-like links 91 thus form continuous drive chains 94 for the conveyor. The chains 94 ride in suitable channel-like guide members 96 and 97, as shown in Figs. 17 and 18.

Figures 15, 16:
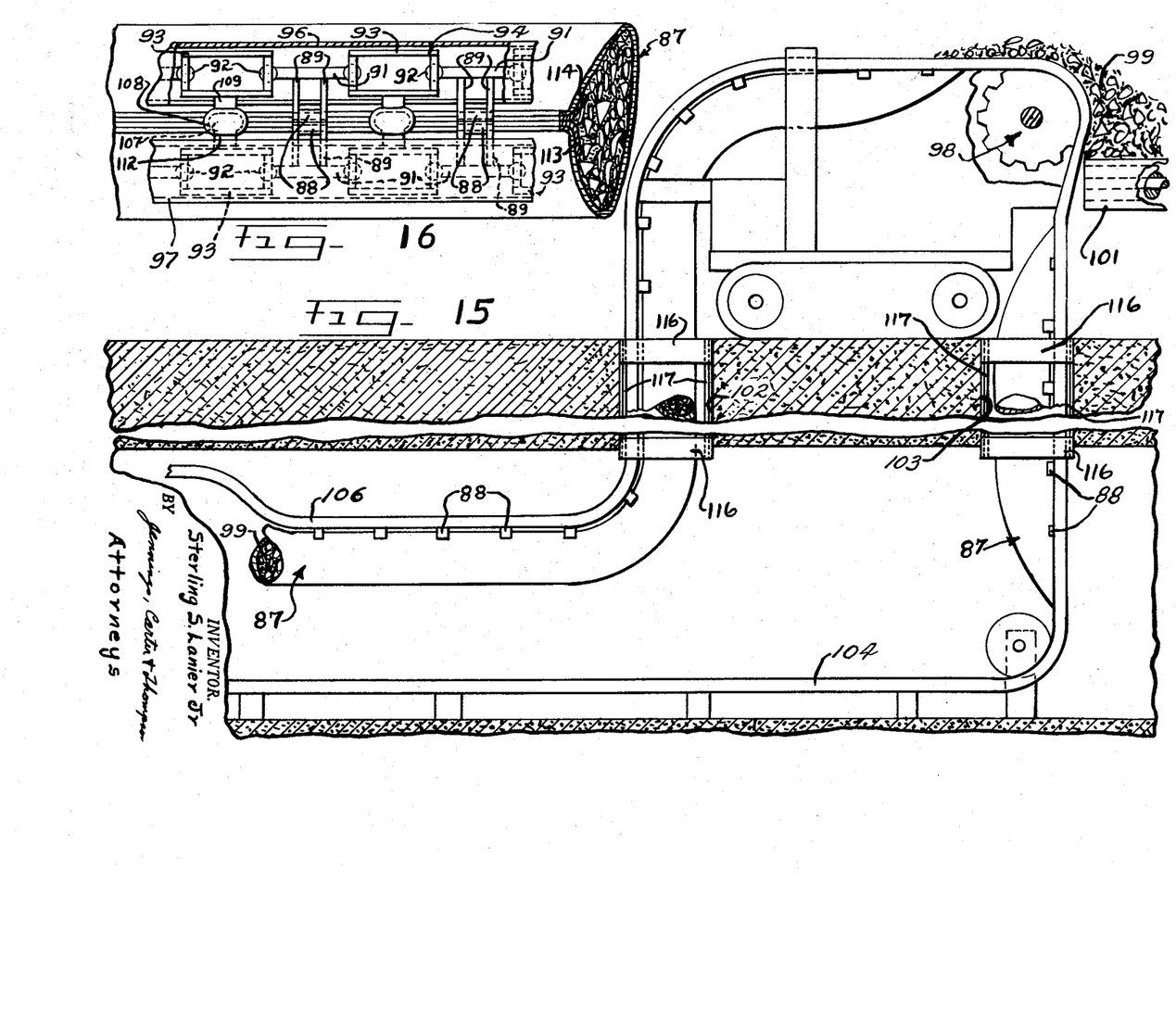
Fig. 15 is a vertical sectional view, partly broken away and in section showing diagrammatically a still further modified form of conveyor.
Fig. 16 is a fragmental plan view of the conveying section of the conveyor shown in Fig. 15.

The conveyor belt 87 passes over suitable head and tail sections which are similar to the head and tail sections 11b and 12b, the tail sections being shown generally at 98 and the head section being omitted.

As the conveyor belt 87 approaches the tail section 98 the belt is moved to a horizontal position in the manner described heretofore with reference to the conveyor belt 10b whereby the material being conveyed indicated at 99 is transferred to a suitable conveyor belt 101. It will be apparent that instead of employing the conveyor belt 101, the conveyor belt 87 could extend to a location removed from the mine shafts 102 and 103, and if desired convey around curves in horizontal or vertical planes. To move the belt to the extended position, the channel-like guide members 96 and 97 are spaced further apart adjacent the tail section 98. After passing over the tail section 98, the guide members 96 and 97 are positioned close together, as shown in Fig. 18 whereby the edges of the belt are drawn together as the belt passes downwardly through the shaft 103. After passing through the shaft 103, the guide members 96 and 97 are moved outwardly from each other whereby the belt 87 assumes a relatively flat position, as at 104 whereby a minimum of space is taken up by the return flight of the conveyor belt. After passing over the head section of the conveyor, not shown, the belt 87 moves to a slightly lower elevation whereby a dip is provided in the path of movement of the conveyor belt, as shown at 106. As the conveyor belt 87 is moving beyond the receiving terminal or tail terminal, the channel-like members 96 and 97 are positioned progressively closer until they are adjacent each other, as shown in Figs. 16 and 17 whereby the edges of the belt 87 are drawn together for holding the material 99 being conveyed. As the belt 87 approaches the vertical shaft 102, the material 99 becomes packed within the confines of the belt thus deforming the same and preventing axial movement of the material 99 within the conveyor belt. That is to say, the irregular shape of the coal or the like being conveyed causes the inner surface of the belt to be deformed for receiving the outwardly projecting edges of the material 99 whereby the material is locked against shifting in the belt as it is conveyed upwardly through the vertical shaft 102.

Figures 19, 20:
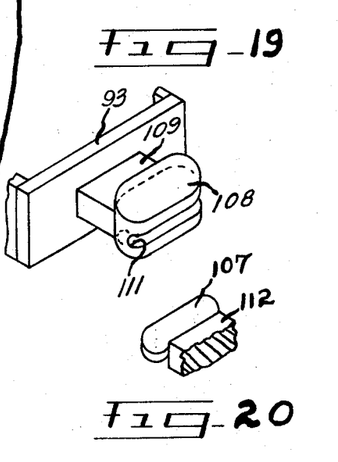
Fig. 19 is a fragmental perspective view, showing the female coupling member for the apparatus shown in Figs. 15 through 18.
Fig. 20 is a fragmental perspective view showing the male coupling member for the apparatus shown in Figs. 15 through 18.

To assure that the edges of the belt 87 are held in engagement with each other and to hold the edges of the belt in longitudinal alignment with each other, I provide male and femal coupling members 107 and 108, as shown in Figs. 16, 18, 19 and 20. The female coupling member 108 is mounted on a bracket 109 which is secured rigidly to the inner surface of the link members 93, as shown in Fig. 19. The female coupling member 108 is provided with a groove 111 on the inner surface thereof for receiving the male coupling member 107. The male coupling member 107 is secured to a bracket 112 which is attached to the link member 93 of the chain 94 at the opposite edge of the belt 87. As the edges of the belt 87 are drawn toward each other by the closer position of the channel-like guide members 96 and 97, the male coupling member 107 enters the recess 111 of the female coupling member 108 whereby the longitudinal edges of the belt are maintained in exact alignment with each other and are interlocked as the belt passes upwardly through the shaft 102 and downwardly through the shaft 103. To form an effective seal between adjacent edges of the belt 87, I provide longitudinally extending strips of soft flexible material, such as rubber or the like, 113 and 114 along opposite edges of the belt in position to engage each other, as shown in Figs. 16, 17 and 18. At the discharge terminal, as the edges of the belt are drawn apart by wider spacing of guides 96—97, the male member is released from the female member. After passing over the discharge pulley, the guide members draw the edges together again.

The channel-like guide members 96 and 97 are supported within the vertical shafts 102 and 103 by a plurality of annular support members 116 which are in turn held in fixed vertical positions relative to each other by vertical support members 117.

In view of the foregoing, it will be seen that I have devised an improved conveyor which is particularly adapted for conveying materials, such as coal and the like, around curves or over surfaces having irregular dips and rises therein. By providing an endless belt attached to continuous chains which are inescapably guided around curves by mobile support units, the belt is maintained in proper alignment with the mobile support units. Also, by providing a continuous controllable flexible draw bar which is in the form of linked segments resembling vertebrae along the longitudinal center line of the conveyor, the mobile support units attached thereto travel in tandem around curves, thus assuring smooth operation of the conveying apparatus even while the conveyor frame is traveling. Furthermore, by providing male and female couplings between the drive chains at the edges of the belt, both edges of the belt travel together, thus preventing one edge from moving longitudinally relatively to the other edge of the belt.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In conveying apparatus including an endless conveyor belt having a head terminal at one end and a tail terminal at the other end thereof around which said belt passes, an endless flexible member operatively connected to said belt adjacent the longitudinal center thereof, mobile supporting frames positioned at intervals between said head terminal and said tail terminal, guide members carried by said frame in position to inescapably engage said flexible member, a continuous controllable flexible draw bar connecting adjacent ones of said mobile supporting frames, three idler rollers carried by and mounted on the supporting frames to support the conveying flight of said belt with vertical rollers at each side of a central horizontal roller positioned beneath said belt whereby the sides of said belt are bent upwardly, there being an annular groove in said horizontal roller, guide members preceding said groove and engaging said endless flexible member whereby said flexible member is inescapable from said guide members, and means for propelling said belt.

2. In conveying apparatus including an endless conveyor belt having a head terminal at one end and a tail terminal at the other end thereof, a plurality of mobile belt support units positioned at intervals between said head terminal and said tail terminal, an endless flexible member connected to the longitudinal center of said belt, guides carried by each support unit in which the flexible member is guided and supported in retaining relation, a plurality of continuous laterally flexible draw bars extending between and pivotally connecting adjacent support units to each other whereby the individual draw bars are adapted for vertical movement relative to each other, each flexible draw bar being of a generally rectangular cross section with the greater dimension thereof extending in a vertical plane and of a rigidity to permit each individual draw bar to bend in a generally horizontal arcuate path when pivotally connected to adjacent support units while remaining rigid in the vertical plane, an intermediate belt supporting frame rigidly connected to and fully supported by the draw bar between adjacent support units and extending upwardly therefrom, a guide on said supporting frame to support and guide said flexible member in retaining relation, a support member on each side of said intermediate supporting frame to contact and support the conveying flight of said endless conveyor belt, and means to drive said endless belt and said flexible member between the head terminal and the tail terminal.

3. In conveying apparatus including an endless conveyor belt having a head terminal at one end and a tail terminal at the other end thereof with the conveying flight of said belt disposed over the return flight, a plurality of mobile support units positioned at intervals between said head terminal and said tail terminal to support said belt, an endless flexible member secured to said endless belt adjacent the longitudinal center thereof, a plurality of continuous laterally flexible draw bars extending between and pivotally connecting adjacent support units to each other whereby the individual draw bars are adapted for vertical movement relative to each other, each flexible draw bar being of a generally rectangular cross section with the greater dimension thereof extending in a vertical plane and of a rigidity to permit each individual draw bar to bend in a generally horizontal arcuate path when pivotally connected to adjacent support units while remaining rigid in a vertical plane, an intermediate belt supporting frame rigidly connected to the draw bar between the mobile support units and extending upwardly and downwardly from said draw bar while fully supported thereby, a guide adjacent the upper and lower ends of the supporting frame for receiving and guiding the flexible member in retained relation, a support member on each side of said supporting frame to support the conveying flight of said endless conveyor belt, and means to drive the endless belt and said flexible member between the head and the tail terminals.

References Cited in the file of this patent
UNITED STATES PATENTS

| | | |
|---|---|---|
| 1,359,582 | Dolton | Nov. 23, 1920 |
| 1,548,278 | Phillips et al. | Aug. 4, 1925 |
| 1,826,853 | Williams et al. | Oct. 13, 1931 |
| 2,543,368 | Jones et al. | Feb. 27, 1951 |
| 2,836,283 | Horth | May 27, 1958 |
| 2,850,147 | Hill | Sept. 2, 1958 |

FOREIGN PATENTS

| | | |
|---|---|---|
| 506,403 | Belgium | Oct. 31, 1951 |
| 805,505 | Germany | May 21, 1951 |
| 1,108,853 | France | Sept. 14, 1955 |